US010558707B2

(12) United States Patent
Stankovic et al.

(10) Patent No.: US 10,558,707 B2
(45) Date of Patent: Feb. 11, 2020

(54) METHOD FOR DISCOVERING RELEVANT CONCEPTS IN A SEMANTIC GRAPH OF CONCEPTS

(71) Applicants: HYPIOS SAS, Paris (FR); UNIVERSITE DE PARIS IV PARIS-SORBONNE, Paris (FR)

(72) Inventors: Milan Stankovic, Paris (FR); Philippe Laublet, Paris (FR)

(73) Assignees: HYPIOS CROWDINNOVATION, Paris (FR); SORBONNE UNIVERSITE, Paris (FR)

( * ) Notice: Subject to any disclaimer, the term of this patent is extended or adjusted under 35 U.S.C. 154(b) by 633 days.

(21) Appl. No.: 15/561,936

(22) PCT Filed: Feb. 28, 2013

(86) PCT No.: PCT/EP2013/054088
§ 371 (c)(1),
(2) Date: Sep. 26, 2017

(87) PCT Pub. No.: WO2013/127951
PCT Pub. Date: Sep. 6, 2013

(65) Prior Publication Data
US 2018/0203943 A1 Jul. 19, 2018

(30) Foreign Application Priority Data
Feb. 29, 2012 (EP) .................................... 12305246

(51) Int. Cl.
*G06F 16/00* (2019.01)
*G06F 16/901* (2019.01)
(Continued)

(52) U.S. Cl.
CPC .... *G06F 16/9024* (2019.01); *G06F 16/24522* (2019.01); *G06F 17/2785* (2013.01)

(58) Field of Classification Search
CPC ............... G06F 17/2785; G06F 16/367; G06F 16/3334; G06F 16/24575; G06F 16/3344;
(Continued)

(56) References Cited

U.S. PATENT DOCUMENTS

| 6,711,585 | B1* | 3/2004 | Copperman .......... G06F 16/367 |
| 7,146,349 | B2* | 12/2006 | Benitez-Jimenez .... G06F 16/40 706/46 |

(Continued)

OTHER PUBLICATIONS

Yan Shvartzshnaider, "Global Semantic Graph as an Alternative Information and Collaboration Infrastructure", The Semantic Web: Research and Applications, ESWC 2010, pp. 483-487.

(Continued)

*Primary Examiner* — Merilyn P Nguyen
(74) *Attorney, Agent, or Firm* — Womble Bond Dickinson (US) LLP (57) ABSTRACT

The present invention is related to a method for identifying in a given semantic graph of linked concepts a set of concepts matching the content of a text, the semantic graph of linked concepts being stored in at least one equipment connected to a network, the methods comprising of the following steps:
- inputting a sample text in natural language at a workstation connected to the network;
- performing a semantic analysis of the sample text to extract a set of initial concepts belonging to the given semantic graph;
- accessing the equipment to identify a list of candidate concepts in the given semantic graph, the candidate concepts being the concepts of the semantic graph within a given maximum distance according to a given distance function away from an initial concept;
- calculating for each candidate concept a proximity score representative of the distances between the candidate concept and each initial concept;
- identifying as matching concepts the candidate concepts with the highest proximity score.

10 Claims, 4 Drawing Sheets

(51) Int. Cl.
*G06F 16/2452* (2019.01)
*G06F 17/27* (2006.01)

(58) Field of Classification Search
CPC ........... G06F 16/24522; G06F 16/9024; G06F 16/3329
See application file for complete search history.

(56) References Cited

U.S. PATENT DOCUMENTS

| | | | |
|---|---|---|---|
| 7,571,177 B2* | 8/2009 | Damle | G06F 17/2785 |
| 8,775,459 B2* | 7/2014 | Houck | G06F 16/243 707/768 |
| 9,378,202 B2* | 6/2016 | Larcheveque | G06F 17/2785 |
| 2008/0270120 A1* | 10/2008 | Pestian | G06F 17/2785 704/9 |
| 2010/0023482 A1 | 1/2010 | Mershon et al. | |
| 2010/0235307 A1* | 9/2010 | Sweeney | G06N 5/02 706/12 |
| 2011/0131244 A1* | 6/2011 | Padovitz | G06F 16/367 707/776 |
| 2012/0150874 A1* | 6/2012 | Sweeney | G06F 17/2785 707/749 |

OTHER PUBLICATIONS

Office Action Received for European Patent Application No. 12305246.6, dated Mar. 14, 2018, 5 pages.
Office Action Received for European Patent Application No. 12305246.6, dated Aug. 8, 2017, 5 pages.
Liu et al., "Modeling Web Services using Semantic Graph Transformations to aid Automatic Composition", IEEE International Conference on Web Services, (ICWS 2007), 2007, 8 pages.
International Search Report and Written Opinion received for PCT Application No. PCT/EP2013/054088, dated Apr. 29, 2013, 8 pages.
International Preliminary Report on Patentability received for PCT Application No. PCT/EP2013/054088, dated Sep. 12, 2014, 6 pages.
European Search Report and Written Opinion received for EP Application No. 12305246.6, dated Jul. 5, 2012, 6 pages.

* cited by examiner

METHOD FOR DISCOVERING RELEVANT CONCEPTS IN A SEMANTIC GRAPH OF CONCEPTS

FIELD OF THE INVENTION

The invention concerns the field of the Semantic Web.

More precisely, the invention relates to a method for identifying in a given semantic graph of linked concepts a set of concepts matching the content of a text.

BACKGROUND OF THE INVENTION

The Semantic Web is a set of technologies, which aim to make the content of the resources of the Web accessible and usable by machines (in particular thanks to programs and software agents) through a system of data and metadata.

RDF (Resource Description Framework) is the language that can be used for resource representation in a semantically rich way. RDF is a data model of semantic graph (a collection of RDF statements can intrinsically represent a graph of linked "concepts"), designed for helping to describe the resources on the Web and their metadata, allowing automated processing. It is implemented using a variety of syntax formats, but XML is generally preferred.

The mentioned items of a semantic graph named "concepts" (or sometimes "entities") are to be understood as a basic unit of computationally represented meaning, usually embodying a topic of interest. A concept has a representation intended for human consumption (sometimes a plurality of representations, when the same concept is known under more than one name), and an identifier (called a URI, Uniform Resource Identifier) for identification by machines. The concept meaning is further specified by possible properties, that may have literal values or point to another concept (examples of concepts will be presented below). Properties that point to other concepts create the links between concepts that constitute the semantic graph.

Thanks to initiatives like Linked Open Data, a practice of publishing structured data on the Web built upon compatible standard Web technologies and interlinking it has emerged, enabling the emergence of a giant rapidly-growing semantic graph of linked concepts describing general knowledge as particular areas (e.g. geography, humanities, etc.) Most notably, databases such as DBpedia or Freebase contain millions of concepts from general encyclopedic knowledge, and are still exploring the internet to gather new concepts.

Such ability to automatically process the human knowledge by machines offers new possibilities for many usage scenarios and especially for helping solving various problems, e.g. innovation problems. From the description of a given problem, the idea is to explore the semantic graph in search of concepts related to potential solutions. In the millions of existing concepts known to humanity, finding those that are the most likely to point to a solution remains very difficult.

In the context of semantic annotation, some known "concept recommendation systems" enable, from a sample text that describes the problem to identify concepts directly relevant to the problem (the "initial" concepts) and to place them on the semantic graph, in order to help the user to discover concepts which are in the vicinity of some initial concepts and to deepen the understanding of the current domain of interest of the user.

Similar concept recommendation is for example performed by search engines like Google that suggest and display search queries (based on other users' search activities), which might be similar to the one a user is typing in the search bar.

However, it appears that these systems offer only a partial view of the conceptual space that is driven mostly by obvious associations with initial concepts, and so they still do not provide sufficiently valuable results, enriching for the user.

There is a need for new methods of smart exploration of semantic graphs to enable the user to discover less obvious useful concepts.

SUMMARY OF THE INVENTION

The present invention proposes a method for identifying in a given semantic graph of linked concepts a set of concepts matching the content of a text, the semantic graph of linked concepts being stored in at least one equipment connected to a network, the methods comprising of the following steps:
 inputting a sample text in natural language at a workstation connected to the network;
 performing a semantic analysis of the sample text to extract a set of initial concepts belonging to the given semantic graph;
 accessing the equipment to identify a list of candidate concepts in the given semantic graph, the candidate concepts being the concepts of the semantic graph within a given maximum distance according to a given distance function away from an initial concept;
 calculating for each candidate concept a proximity score representative of the distances between the candidate concept and each initial concept;
 identifying as matching concepts the candidate concepts with the highest proximity score.

Preferred but non-limiting features of the present invention are as follows:
 the step of identifying a list of candidate concepts in the given semantic graph comprises of the iterative generation of maxLevel successive concept suburbs, where maxLevel is the value of the given maximum distance, each concept suburb being a subgraph of the given semantic graph, the first concept suburb only comprising of the concepts linked to an initial concept with a distance 1 according to the distance function, and the kth concept suburb only comprising of the concepts linked to a concept of the (k−1)th concept suburb, which do not belong to the previous concept suburbs with a distance 1 according to the distance function, the candidate concepts being the concepts belonging to a concept suburb;
 the step of calculating for each candidate concept a proximity score is performed concept suburb by concept suburb;
 the proximity score of a concept c is given by the formula $$hyP(c, IC) = \sum_{c_i \in IC} dv(c, c_i),$$

where IC is the set of initial concepts, and dv(a, b) a weighted value of the distance between concepts a and b;
 the weighted value of the distance between two concepts a and b (i.e. the weighted distance function) is given by the formula $dv(a,b)=p(a,b)/d(a,b)$, where $d(a, b)$ is the distance according to the given distance function between concepts a and b in the semantic graph, and where p(a,b) is a weight. Alternatively a weighted distance function can be a linear combination of functions that follow the given formula;

the weight is given by the formula $p(a,b)=e^{-\lambda \cdot d(a,b)}$, where $\lambda$ is a given positive coefficient, or by the formula $p(a,b)=-\ln(P)$, where P is the probability of finding the concept b in the graph when going from concept a, or by the formula $p(a,b)=-\ln(1/n)$ where n is the number of concepts to which the concept a is connected over the same property that connects it to the concept;

the given semantic graph comprises at least a first type of link and a second type of link, the steps of accessing the equipment to identify a list of candidate concepts in the given semantic graph and calculating for each candidate concept a proximity score representative of the path distances between the candidate concept and each initial concept being performed considering only one type of link for distance measurement;

the steps of accessing the equipment to identify a list of candidate concepts in the given semantic graph and calculating for each candidate concept a proximity score representative of the path distances between the candidate concept and each initial concept being performed a first time considering only the first type of link, and a second time considering only the second type, the global proximity score of a candidate graph being a function of each proximity score considering only one type of link;

the links of the first type are hierarchical links connecting a concept to a category concept, and the links of the second type are transversal links connecting two non-category concepts;

the transversal links comprise of explicit transversal links and implicit transversal links, the method further comprising prior to the identification of a list of candidate concepts in the given semantic graph, a step of identifying the implicit transversal links for considering them as explicit transversal links;

accessing the equipment consists of sending a SPARQL query.

BRIEF DESCRIPTION OF THE DRAWINGS

The above, and other objects, features and advantages of this invention, will be apparent in the following detailed description, which is to be read in connection with the accompanying drawings wherein.

DETAILED DESCRIPTION OF THE INVENTION

Environment

Figure 1:
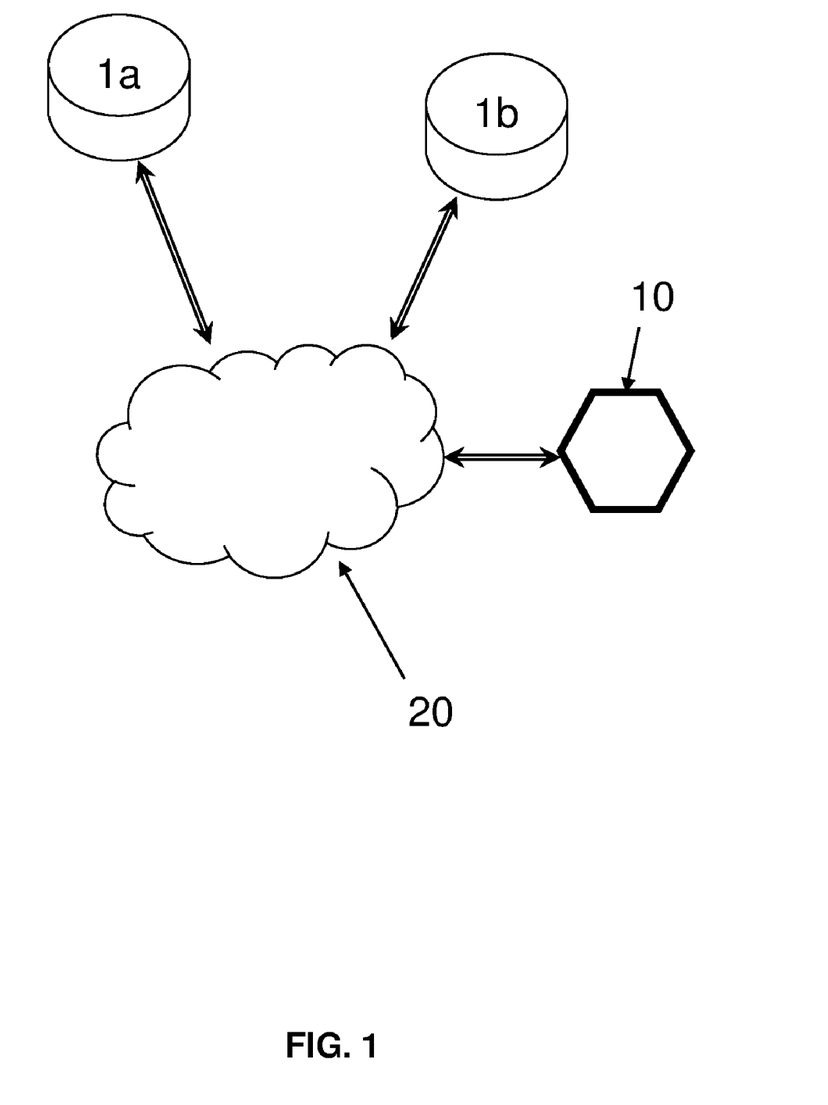
FIG. 1 represents the environment in which the method according to the invention is carried out.

With reference to FIG. 1, the invention concerns a method for identifying in a given semantic graph of linked concepts a set of concepts matching the content of a text, the semantic graph of linked concepts being stored in an equipment 10 connected through a network 20, particularly the internet However, the invention is not limited to a specific environment, and the equipment 10 is shall be understood as any "source(s)" from which the semantic graph of linked concepts could be accessed through the network 20. The equipment 10 may include one or more piece(s) of equipment.

In this case the network 20 is Internet, the equipment 10 is notably a Web server.

Indeed, the already mentioned large semantic graphs of linked concepts from general encyclopedic knowledge (e.g. DBpedia, Freebase, etc.) are hosted in the form of Graph data stores, in particular RDF databases, in one or more remote servers. The given semantic graph of linked concepts may be a particular graph, or a combination thereof. These graphs are indeed connected to one another, forming a global graph.

The method according to the invention thus remotely accesses via the network 20 to this or these databases from a workstation 1a, 1b where a sample text in natural language is inputted.

Furthermore, it shall be noted that the semantic graph can be hosted on the very workstation 1a, 1b, enabling offline functioning. In such a case, the "local" semantic graph can be regularly updated from the equipment 10.

The sample text in natural language to be processed is, as explained generally the description of a problem to be resolved, and the "matching concepts" which are intended to be identified because of the method according to the invention are concepts particularly relevant to potential solutions of the problem, and which are not directly related to the problem (these concepts are sometimes referred as "laterally" related to the problem).

The text may be inputted directly by the user at the workstation 1 by typing, or an already typed text may be uploaded. If the workstation has suitable input means, the text can also be voice-inputted through speech recognition or paper-inputted through scanning and OCR (Optical Character Recognition). Please note that the text may also be already hosted somewhere in the network 20. In which case, inputting the text at the workstation is to be understood as only indicating how to retrieve the text (for example by inputting its URL).

For these various purposes, a client application may be installed on the workstation, but alternatively a simple browser may be used to access a remote client application.

Semantic Analysis

A semantic analysis is then performed on the sample text to extract a set of initial concepts. By "initial concepts" (also named "seed concepts"), it is meant concepts directly describing the inputted problem that are in an evident and direct relation with problem description. In other words, initial concepts are generally mined from the wording of the text by parsing followed by lexical analysis to match concepts which are known to belong to the given semantic graph.

This step may be performed by the workstation 1 itself, or alternatively by a server dedicated to semantic analysis, this server being also connected to the internet 20. The inputted text is in this case transmitted from the workstation 1 (or from the indicated location where the text is found) to the dedicated server where the semantic analysis is performed. Identified initial concepts are thus sent back to the workstation 1.

Numerous efficient semantic analysis engines are known (e.g. Zementa, Open Calais, DBpedia Spotlight, etc.), and the person skilled in the art would know how to use them within the framework of the invention.

For example, if the set problem is related to "how to produce electricity from sugarcane bagasse?" a semantic analysis should identify meaningful words "electricity" and "sugarcane" by simply parsing the phrase. Given the graph DBpedia (whose concepts are Wikipedia's pages), the associate initial concepts are then http://en.wikipedia.org/wiki/Electricity and http://en.wikipedia.org/wiki/Sugarcane.

The aim of the method according to the invention is to help explore the semantic graph of DBpedia concepts, for example reaching the relevant concept http://en.wikipedia.org/wiki/Biomass_energy_crop, which is neither thought to be directly linked to "electricity" nor to "sugarcane".

Figure 2:
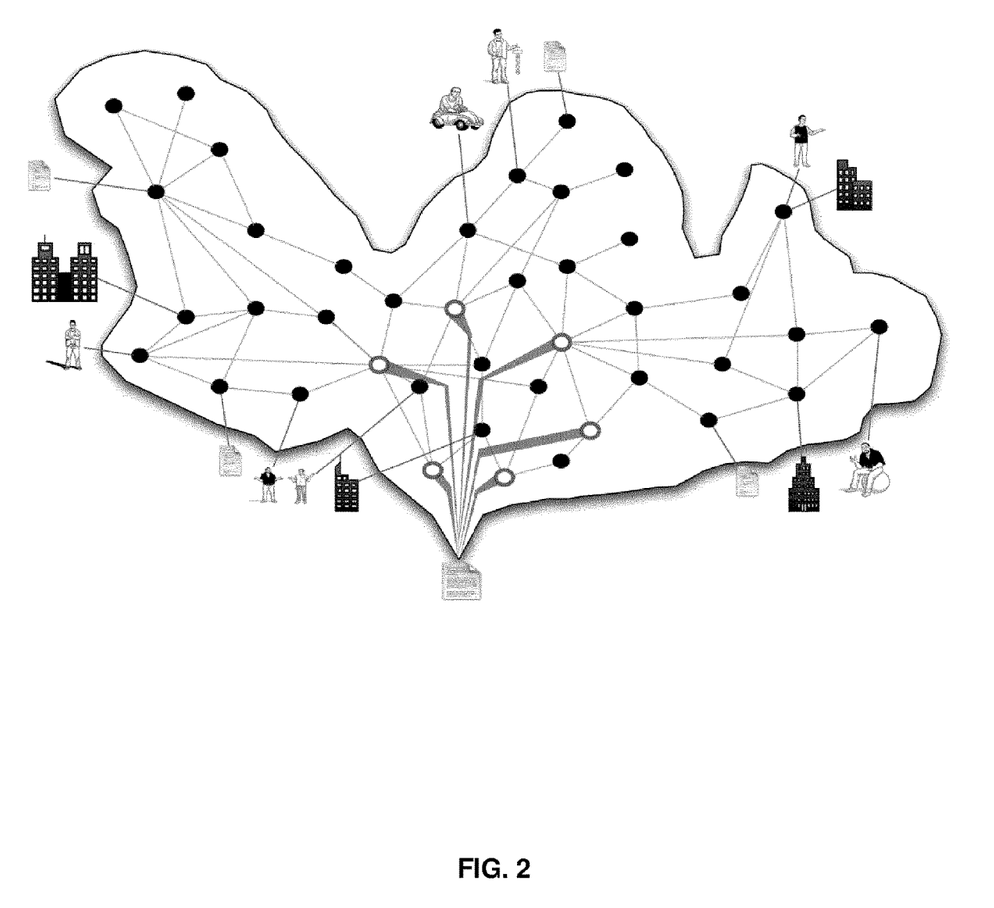
FIG. 2 represents a semantic graph of concepts.

The association of parsed words and concepts may be performed for example by a search engine, in particular Wikipedia's search engine in the case of DBpedia. The initial concepts are then located on the semantic graph. FIG. 2 represents an example of semantic graph (each point is a concept), wherein six initial concepts (circled white points) are located. As it can be noticed, the initial concepts are not necessarily directly linked to each other.

Candidate Concepts

The next step of the method is to access the semantic graph (which in particular consists of sending a query over the graph, for example using the SPARQL language through HTTP protocol) to identify a list of candidate concepts in the given semantic graph. The "candidate concepts" are to be understood as concepts that are found at a certain distance (calculated according a certain distance function) from the initial concepts, and that are likely to be relevant. Among them, the "matching concepts" will be identified in a further step.

The candidate concepts are spotted in the method according to the invention as the concepts of the semantic graph within a given maximum distance away from an initial concept. Different distance functions will be explained below, but as a first example a simple distance function between two given concepts of the semantic graph may be calculated as the number of links to cross for traversing the graph from one concept to another.

The value (MaxLevel) of given maximum distance is set by the user. The higher this value the more deeply the graph will be explored (and the more likely the set of candidate concepts will contain all the matching concepts), but the longer the computing time will be. According to tests in the case of DBpedia, a MaxLevel of 3 or 4 appears to have more than enough of every matching concept, and the level 2 is sufficient if the end user of the results is not a machine (it is difficult for a human to read and assimilate more than 200 concepts in a reasonable time).

Suburb Exploration

Advantageously, the step of identifying a list of candidate concepts in the given semantic graph comprises the iterative generation of maxLevel successive "concepts suburbs". Each concept suburb is a subgraph of the given semantic graph, which brings together the concepts of the semantic graph at a given distance from one of the initial concepts.

Concepts suburbs are built iteratively:
concept suburb "zero"=the initial concepts;
$1^{st}$ concept suburb=the concepts linked to an initial concept with a distance 1 according to the distance function (except the initial concepts themselves);
$2^{nd}$ concept suburb=the concepts linked to an initial concept with a distance 2 according to the distance function=the concepts linked to an initial concept by exactly two successive links=the concepts linked to a concept of the $1^{st}$ concept suburb with a distance 1 according to the distance function, which do not belong the $1^{st}$ concepts suburb and which are not initial concepts;
. . .
$k^{th}$ concepts suburb=the concepts linked to a concept of the $(k-1)^{th}$ concept suburb with a distance 1 according to the distance function.

In other words, the union of the successive k first concept suburbs ($U_k\{k^{th}$ concept suburb$\}$) comprises every concept of the semantic graph within a distance k from at least one initial concept. Thus, the union of the successive maxLevel first concepts suburb comprises every concept of the semantic graph within a distance maxLevel (i.e. within the maximum distance) from at least one initial concept.

The concepts belonging to one of the concept suburbs are therefore the candidate concepts.

HyProximity

The approach of the method according to the invention for suggesting concepts that are relevant to a number of initial concepts is based on two main principles:
1. Concepts with a shorter distance from the initial concepts are considered to be closer and more relevant;
2. Concepts found by exploration of the graph near several initial concepts are more relevant that those that appear near only one initial concept.

The method according to the invention therefore consists of calculating for each candidate concept a proximity score representative of the distances between the candidate concept and each initial concept. The shorter the distance between the candidate concept and each initial concept, the higher its proximity score.

This step is advantageously performed at the workstation 1 by processing means of the workstation 1.

If candidate concepts are identified by generating successive concept suburbs per suburb, this step of calculating for each candidate concept a proximity score is performed on the newly identified concept candidates each time a new concept suburb is generated.

The idea of "semantic proximity" (or "HyProximity") from a candidate concept to a set of initial concepts, which shall be clearly distinguished from the distance, implies taking into account each distance from the candidate concept to one of the initial concepts and associating "a weighting" to the concepts. It allows a diversity of concrete approaches.

Several advantageous embodiments will be described in the following description, but note that the invention is not limited to any particular formula.

Advantageously, the proximity score of a concept c is given by the formula $$hyP(c, IC) = \sum_{c_i \in IC} dv(c, c_i),$$

where IC is the set of initial concepts, and dv(a, b) a weighted value of the distance between concepts a and b.

The weighted value of the distance between two concepts a and b is then for example given by the formula dv(a,b)=p(a,b)/d(a,b), where d(a, b) is the distance between concepts a and b in the semantic graph according to a certain distance function, and where p(a,b) is a weight decreasing when the distance d(a,b) increases.

Therefore, the weighted distance function dv and the distance function d are inversely proportional, the lower the distance between the given concepts a and b the higher the weighted distance value dv(a,b). That is why a candidate concept which is close to numerous initial concepts has a high proximity score.

The candidate concepts with the highest proximity scores are thus acknowledged as matching concepts. Therefore the list of proximity scores may be sorted, and a given number of top results extracted. Alternatively, a proximity threshold may be set, and the candidate concepts with proximity value above the threshold extracted.

Sample Algorithm

The calculation of proximity scores can be done using the following particularly advantageous algorithm represented in pseudo-code:

---
Algorithm
---
1. get initial topic concepts
2. for each initial concept c:
    a. while distance_level++ < maxLevel:
        i. generate concept candidates for the current distance_level
        ii. for each concept candidate $c_i$:
            1. value($c_i$) = dv(c,$c_i$)
            2. get previousValue($c_i$) from Results
            3. put <$c_i$, previousValue($c_i$)+value($c_i$)> to Results
3. sort Results in decreasing order of hyProximity
---

As "matching" concepts, one can identify a desired umber of best-ranked results, by their hyProximity score.

Although simple, this algorithm includes "concept suburbs" exploration (which is carried out initial concept by initial concept). At each increment of the variable "distance_level", the next concept suburb is generated. Weighted distance values between each concept candidate of the new concept suburb and the initial concept which is the "seed" of the sequence of concept suburbs are calculated and then added to the proximity score of the concept candidates in a "results" array.

If a concept candidate $c_i$ does not belong to one of the concept suburbs generated from a given initial concept c (which is the case if the distance between the concept candidate $c_i$ and the initial concept c is above maxLevel value), the algorithm does not include the calculation of the weighted value dv(c,$c_i$): owing to the rapidly decreasing behaviour of the weighted distance function, it can be assumed that dv(c,$c_i$)≈0 for these pairs of concepts.

This algorithm thus avoids numerous unnecessary calculations and is therefore especially efficient. The method according to the invention is however not limited to this particular embodiment, and the skilled person would know how to use alternative methods to calculate a proximity score.

Properties and Links

To precise what has been already mentioned, a dataset following the Linked Data principles is a graph G=(C, P, L) where C={$c_1$, $c_2$, ..., $c_n$} is a set of concepts identified by their URI, P={$p_1$, $p_2$, ..., $p_n$} is a set of properties identified by their URI, used to make links between concepts; and L={$L_1$, $L_2$, ..., $L_n$} such that each $L_i$ represents a link form a concept $c_p$ to concept $c_q$.

Figure 3A:
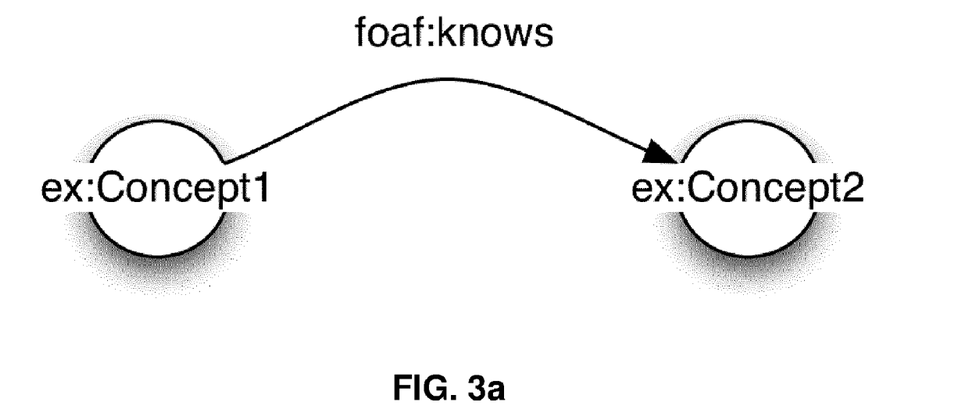
FIGS. 3a and 3b represent different types of links between concepts.
Figure 3B:
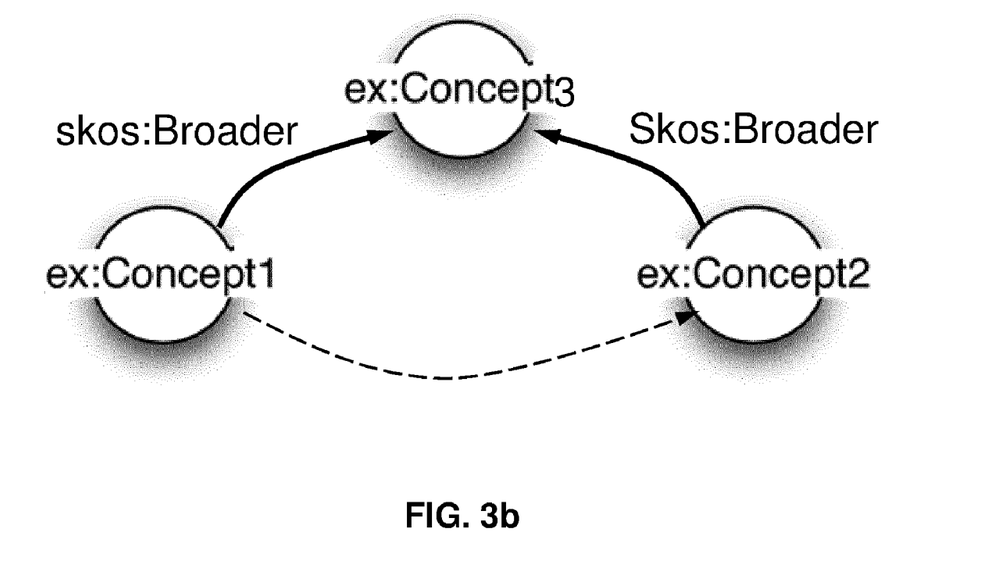

Such a model actually allows more than one type of link between two concepts, as represented by FIGS. 3a and 3b.

The FIG. 3a represents a sample link in the graph, created between two concepts ex:Concept1 and ex:Concept2 using a property foaf:knows. Such a link is called a "transversal" link, i.e. a link which connects two concepts without the aiming to establish a classification or hierarchy. Transversal links may be "direct" when they explicitly connect two concepts (which is the case in the example of FIG. 3a), or "indirect" when the link is implicit, i.e. the two concepts share the same properties with the same literal value (for example ex:concept1 hasCurrency "USD" and ex:concept2 hasCurrency "USD").

Such indirect links are thus inferred, and are therefore the most often non directly represented in the semantic graph.

The method according to the invention comprises therefore advantageously (prior to the step of accessing the of equipment 10) of identifying a list of candidate concepts in the given semantic graph, a step by step process of identifying the implicit transversal links (indirect links) inferred by properties relevant to a particular use case of interest, and considering them as explicit transversal links (direct links), i.e counting them as transversal links (see below).

Alternatively to the "transversal links", the properties that help to organise the concepts in classes (e.g., rdf:type and rdfs:subClassOf) or categories (e.g., dcterms:subject and skos:broader) creates "hierarchical" links. The links created by those properties connect a concept to a "category" concept, by opposition to the "transversal" links that connect two ordinary, non-category concepts. In FIG. 3b, category concept ex: Concept1 (or ex:Concept2) and category concept ex:Concept3 are hierarchically linked using a property, skos:broader (meaning that ex:Concept 3 is more "general" than ex:Concept1 and ex:Concept2). ex:Concept1 and ex:Concept2 are consequently indirectly transversally linked.

In a preferred embodiment of the invention the two types of links ("hierarchical" and "transversal") are treated differently. However, for the sake of simplicity; direct and indirect links are advantageously treated equally by the method according to the invention.

The steps of accessing the server 10 to identify a list of candidate concepts in the given semantic graph and calculating for each candidate concept a proximity score representative of the path distances between the candidate concept and each initial concept are thus performed considering only one type of link for a particular distance measurement.

Different Weighted Distance Functions

As already explained, a simple distance function between two given concepts of the semantic graph may be calculated from the number of links crossed when traversing the graph from one concept to the other, irrespective of the type of links.

Alternatively, other distance functions that consider the type of links may be advantageously used for even more accurate results. As a first embodiment calculating for each candidate concept a proximity score representative of the path distances between the candidate concept and each initial concept can be performed considering only one type of link for distance measurement.

Hierarchical Weighted Distance Functions

Hierarchical approaches exploit hierarchical links (links established over hierarchical properties). They focus on a subset of a given data set's graph G'=(C, P', L') such that P' is the set of only hierarchical properties, and L' is the set of links between concepts created only with those properties.

Figure 4:
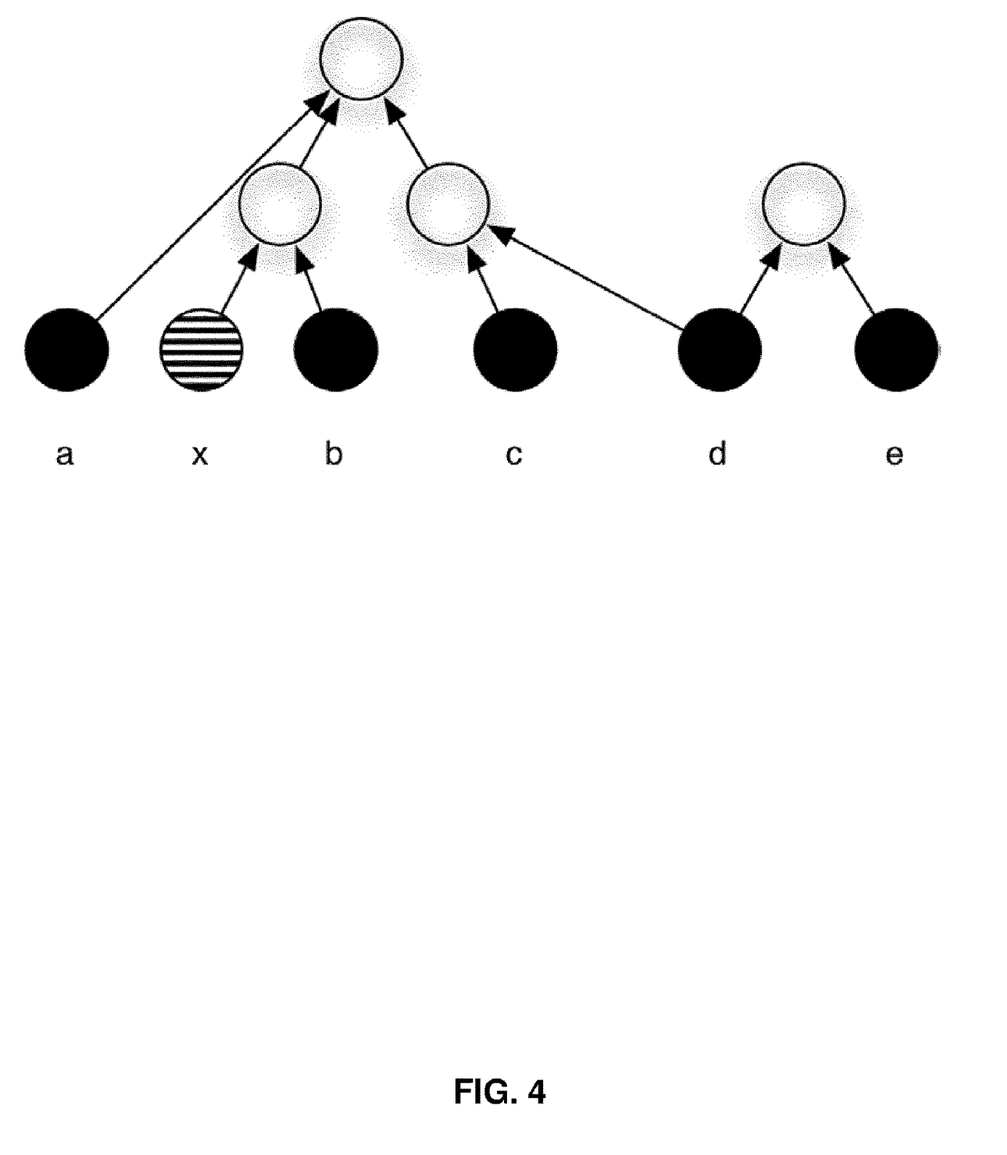
FIG. 4 represents an example of subgraph of a semantic graph.

In finding candidate concepts using the hierarchical links, several examples of distance functions may be distinguished. FIG. 4 represents an example graph of concepts (black nodes) and their categories/types (white nodes), which helps to illustrate the possible distance functions:

D1: To find candidate concepts at distance n, consider each category connected to the starting concept (x) over n links, and find all concepts connected to it directly or over any of its subcategories.

In the example of FIG. 4, this approach would lead to considering {a,b,c,d} as being at distance 2 from x.

D2: To find candidate concepts at distance n, consider each category connected to the starting concept (x) over n links, and find all concepts connected to it directly.

In the example of FIG. 4, this approach would lead to considering only a as being at distance 2 from x.

D3: To find candidate concepts at distance n, consider each category connected to the starting concept (x) over n links, and find all concepts connected to it over any of its subcategories.

In the example shown in FIG. 4, this approach would lead to considering {b,c,d} as being at distance 2 from x.

Different weighting schemes can be used along with the distance functions. A standard choice in graph distance functions is to use the informational content of the category (for example, if the semantic graph is DBpedia, it would be interesting to use the formula p(a,b)=−ln(P) where P is the probability of finding the category in the graph of DBpedia categories when going from bottom up, as a weight function). Applied to our case the weight $p(c, c_i)$ would take the value of the informational content of the first category over which one may find a concept c, when starting from an initial concept $c_i$. As the higher level categories normally have lower informational content, this function naturally gives higher proximity scores to concept candidates found in categories closer to the initial category.

Alternatively, it is possible to use as weight an exponentially decreasing weight function given by the formula $p(a,b)=e^{-\lambda \cdot d(a,b)}$, where d(a,b) is the distance between concepts a and b in the semantic graph according to the certain distance function, and where $\lambda$ is a given positive coefficient. For example, the value $\lambda=0.3$ provides good results.

Tests show that using D3 as a distance function and an exponentially decreasing function as a weight function provides good results, and a low computation time.

Transversal Weighted Distance Functions

Conversely, the transversal approach uses transversal distance functions which rely only on a subset of a data set's graph constructed from transversal properties and the links that they create. However, as the number of properties in a data set might be high, retrieving all of the transversal links may yield time-consuming SPARQL queries. Luckily, not all the properties make relevant connections for a given use case. Our transversal function therefore relies only on a subset of the data set's graph G"=(C, P", L") where the P" is the set of transversal properties relevant for a particular use case of interest.

In order to determine the set of such relevant properties P", one can take a set of example sets of initial concepts, and produce the corresponding desired concept recommendations relevant to potential problem solutions. Discovering the paths that connect the initial sets with their corresponding desired recommended concept sets, and the study of the frequency with which properties appear in those paths would reveal the list of significant properties. Only 5 properties constructing all the paths connecting those two concept sets have (yet) been discovered, properties then used as P".

The transversal distance function asserts the distance 1 for each link (direct or indirect) created between two concepts over one of the properties from P".

In the tests the following weight function was used along with the transversal distance function: p(a,b)=−ln(1/n) where n is the number of concepts to which the candidate concept is connected over the same property that connects it to the initial concept. This way more importance is given to concepts with a lower number of connections than to those acting as general connection hubs.

Mixing Weighted Distance Functions

More advantageously, if the server 10 is accessed twice, once to identify a list of candidate concepts in the given sematic graph and calculating for each candidate concept a proximity score which represents the path distances between the candidate concept and each initial concept considering the first type of link only, and a second time considering only the second type of link. The global proximity score of a candidate graph being a function of each proximity score considering only one type of link.

In other words, a "mixed" distance function which takes into account both hierarchical and transversal links may be used. The mixed distance function therefore relies on a subset of the given data set's graph G*=(C, P'+P", L'+L").

The mixed weighted distance function is preferably a linear combination of the two weighted distance functions that consider one type of link only.

Mixed distance approach gives slightly better results than the other two (hierarchical only or transversal only) approaches.

If candidate concepts are identified by generating concept suburbs, each successive step of generating a given concept suburb may be performed a first time considering only the first type of link, and a second time considering only the second type. In other words, an exemplary concept suburb sequence may be $1^{st}$ suburb(hierarchical)➔$1^{st}$ suburb(transversal)➔$2^{st}$ suburb(hierarchical)➔$2^{st}$ suburb(transversal)➔ etc. Both approaches may also be performed in parallel.

The invention claimed is:

1. A method for identifying in a semantic graph of linked concepts a set of concepts matching a content of a text, the semantic graph of linked concepts being stored in at least one equipment connected to a network, the method comprising inputting a sample text in natural language at a workstation connected to the network;

performing a semantic analysis of the sample text to extract a set of several initial concepts belonging to the semantic graph;

accessing the equipment to identify a list of candidate concepts in the semantic graph, the candidate concepts being concepts among the linked concepts of the semantic graph that are within a predetermined maximum distance away from an extracted initial concept, said predetermined maximum distance being calculated according to a distance function;

calculating for each candidate concept a proximity score representative of distances between each said candidate concept and each of the several initial concepts extracted from said set, wherein the shorter the distance between each said candidate concept and each of the several extracted initial concepts, the higher its proximity score;

identifying as matching concepts the candidate concepts having the proximity score that is highest among the proximity scores calculated for each candidate concept, wherein the step of identifying a list of candidate concepts in the semantic graph comprises an iterative generation of maxLevel successive concept suburbs, where maxLevel is a value of the predetermined maximum distance, each concept suburb being a subgraph of the semantic graph, a first concept suburb only comprising the linked concepts of the semantic graph that are linked to an initial concept with a first distance calculated according to the distance function, and a kth concept suburb comprising only the linked concepts of the semantic graph that are linked to a concept of a (k−1)th concept suburb, which do not belong to previous concept suburbs with the first distance calculated according to the distance function, the candidate concepts being the linked concepts of the semantic graph that belong to a concept suburb.

2. The method according to claim 1, wherein the step of calculating for each candidate concept a proximity score is performed for each candidate of each of the successive concept suburbs iteratively generated.

3. The method according to claim 1, wherein the proximity score of a concept c is given by a formula $$hyP(c, IC) = \sum_{c_i \in IC} dv(c, c_i),$$

where IC is the set of several initial concepts, and dv(a, b) a weighted value of a distance between two concepts a and b belonging to the semantic graph.

4. The method according to claim 3, wherein the weighted value of the distance between the two concepts a and b is given by a formula dv(a, b)×p(a, b)/d(c b), where d(a, b) is a distance calculated according to the distance function between the two concepts a and b, and where p(a,b) is a weight.

5. The method according to claim 4, wherein the weight is given by a formula $p(a, b) = e^{-\lambda d(a,b)}$ where $\lambda$ is a given positive coefficient, or by a formula p(g, b)=−ln(P), where P is a probability of finding the concept b in the semantic graph when going from concept a, or by a formula p(a, b)=−ln(1/n) where n is a number of concepts among the linked concepts of the semantic graph to which the concept a is connected over a same property that connects it to the concept b.

6. The method according to claim 1, wherein the semantic graph comprises at least a first type of link and a second type of link, the steps of accessing the equipment to identify a list of candidate concepts in the semantic graph and calculating for each candidate concept a proximity score representative of distances between said candidate concept and each of the several extracted initial concepts being performed considering only one type of link for distance measurement.

7. The method according to claim 6, wherein the steps of accessing the equipment to identify a list of candidate concepts in the semantic graph and calculating for each candidate concept a proximity score representative of distances between said candidate concept and each of the several extracted initial concepts being performed a first time considering only the first type of link, and a second time considering only the second type, a global proximity score of a candidate graph being a function of each proximity score considering only one type of link.

8. The method according to claim 6, wherein links of the first type are hierarchical links connecting a concept belonging to the semantic graph to a category concept also belonging to the semantic graph, and the links of the second type are transversal links connecting two non-category concepts belonging to the semantic graph.

9. The method according to claim 8, wherein the transversal links comprise of explicit transversal links and implicit transversal links, the method further comprising prior to the identification of a list of candidate concepts in the semantic graph, a step of identifying the implicit transversal links for considering them as explicit transversal links.

10. The method according to claim 1, wherein said accessing the equipment includes sending a SPARQL query.

* * * * *